United States Patent [19]
Vogt

[11] Patent Number: 5,850,464
[45] Date of Patent: Dec. 15, 1998

[54] METHOD OF EXTRACTING AXON FIBERS AND CLUSTERS

[75] Inventor: Robert C. Vogt, Ann Arbor, Mich.

[73] Assignee: ERIM International, Inc., Ann Arbor, Mich.

[21] Appl. No.: 711,260

[22] Filed: Sep. 9, 1996

Related U.S. Application Data

[60] Provisional application No. 60/010,048 Jan. 16, 1996.
[51] Int. Cl.$^6$ ....................................................... G06K 9/00
[52] U.S. Cl. ............................................ 382/128; 382/257
[58] Field of Search .................................... 382/128, 133, 382/173, 256, 257; 128/922

[56] References Cited

U.S. PATENT DOCUMENTS

| | | | |
|---|---|---|---|
| 4,761,075 | 8/1988 | Matsushita et al. | 356/39 |
| 5,072,382 | 12/1991 | Kamentsky | 364/413.08 |
| 5,231,580 | 7/1993 | Cheung et al. | 364/413.13 |
| 5,287,272 | 2/1994 | Rutenberg et al. | 364/413.01 |

OTHER PUBLICATIONS

F. Marques, P. Salembier, X. Navarro, J.R. Sanudo, "Morphological Scheme for Myelinated Nerve Fiber Morphometric Analysis", pp. 122–126. (no date).
J. Serra, P. Salembier, "Mathematical Morphology and its Applications to Signal Processing," May 1993 (no translation available).
Preston, Jr. et al., "Basics of Cellular Logic with Some Applications in Medical Image Processing", *Proceedings of the IEEE,* May 1979, vol. 67, No. 5, pp. 826–855.
Engel et al., "Digital Acquisition and Processing of Electron Micrographs Using a Scanning Transmission Electron Microscope," *Ultramicroscopy,* 1981, vol. 7, No. 1, pp. 45–54.
Li et al., "A Pyramidal Approach for the Recognition of Neurons Using Key Features," *Pattern Recognition,* 1986, vol. 19, No. 1, pp. 55–62.

*Primary Examiner*—Andrew W. Johns
*Attorney, Agent, or Firm*—Gifford, Krass, Groh, Sprinkle, Patmore, Anderson & Citkowski

[57] ABSTRACT

The extraction and pre-cueing of axon fibers and clusters is performed on transmission electron micrograph (TEM) image mosaics to reduce neuroanatomist workload. Given a multiplicity of myelin-sheathed axon fibers in a cross-sectional image containing many such fibers, the inventive method uses these grey-level operators to effectively identify co-occurrences of the axon fibers and their myelin sheaths and output a result representative of these co-occurrences. The co-occurrences may then be sorted in terms of their geometry to identify groups of fibers indicative of axon clusters. Specifically, a grey-level opening and conditional dilation is performed on the image to obtain a first residue representative of potential axons A grey-level closing and conditional erosion of the first opening image is then performed to obtain a second residue representative of potential axon fibers, including their respective myelin sheaths. The first residue may then be used as a marker to conditionally dilate over the second residue to identify the co-occurrences. The method of the invention significantly reduces the workload of the reviewers by identifying roughly 95 percent of the axons, with only a one to two percent false alarm rate, based on a reasonable computation time of about one hour per sample on a fast workstation.

15 Claims, 5 Drawing Sheets

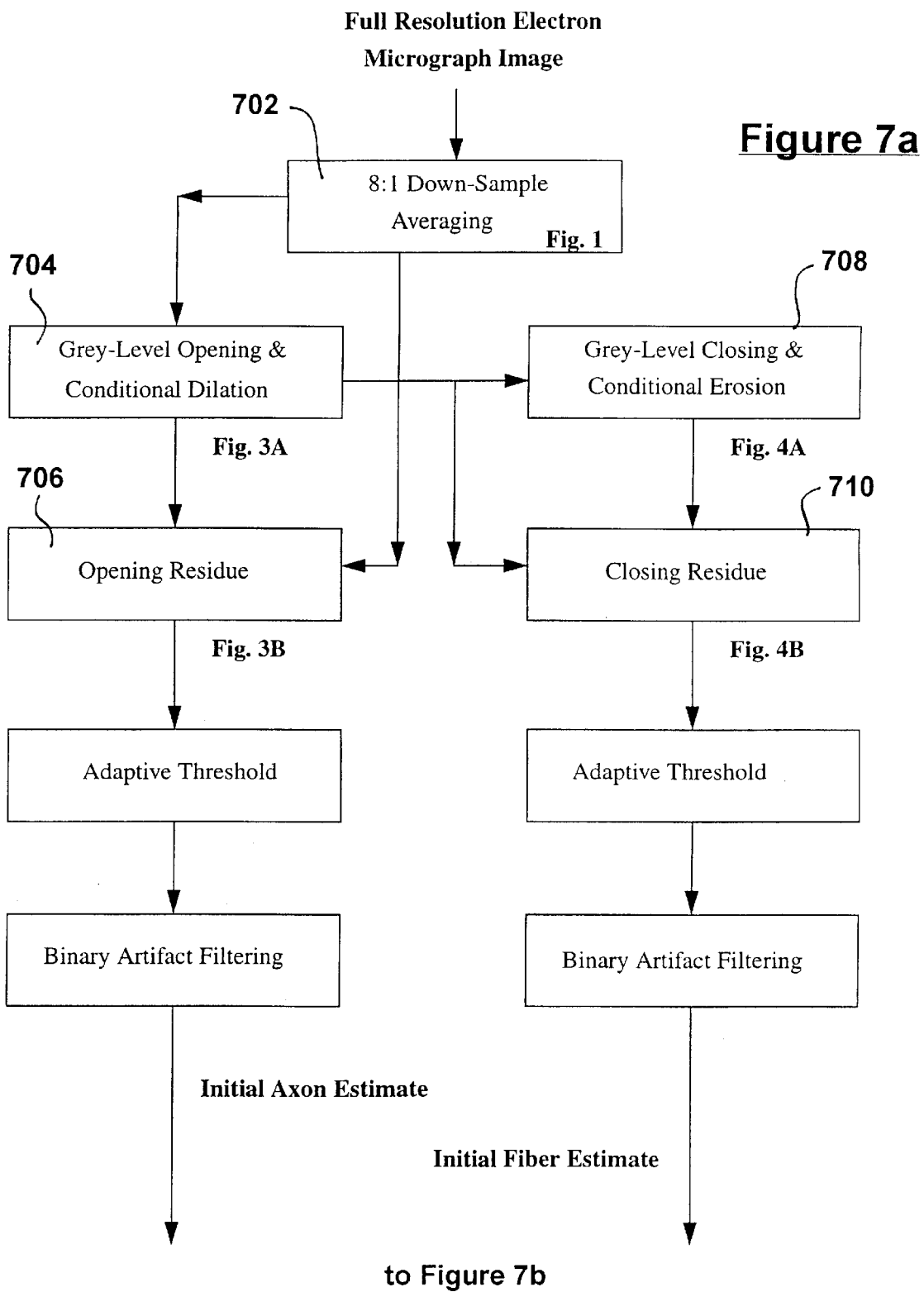

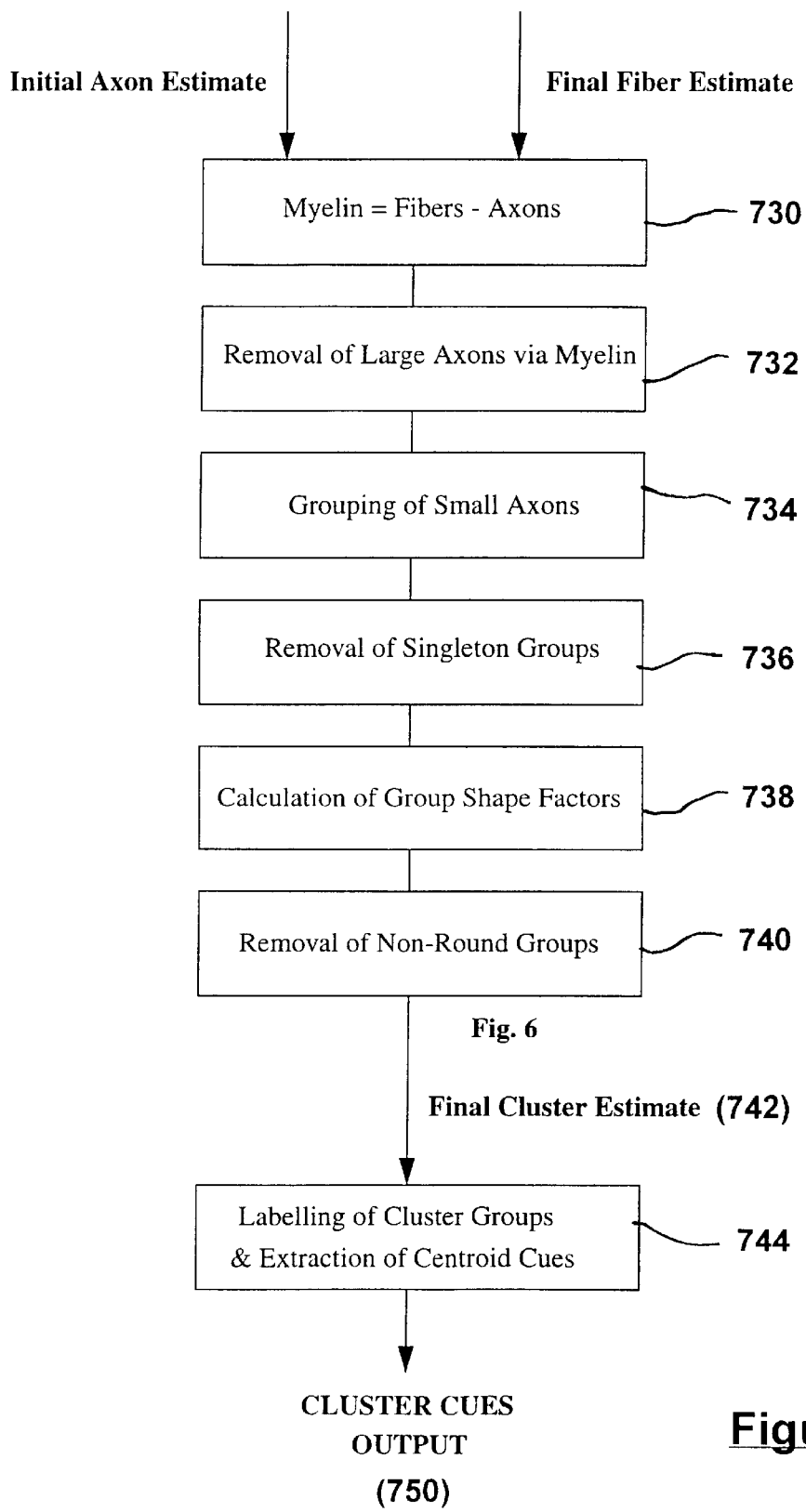

METHOD OF EXTRACTING AXON FIBERS AND CLUSTERS

REFERENCE TO RELATED APPLICATION

This application claims priority of U.S. provisional application Ser. No. 60/010,048, filed Jan. 16, 1996.

FIELD OF THE INVENTION

The present invention relates generally to the identification of axons and axon clusters, as might be useful, for example, in a nerve regeneration study, and, more particularly, to a method of automatically queuing axons and axon groups through morphological operations.

BACKGROUND OF THE INVENTION

Diabetes is a progressive disease with many negative side effects that appear in its later stages. One of these effects is the degeneration of peripheral nerve tissue, leading to numbness in the extremities, and sometimes contributing to cell death, gangrene, and the loss of toes or feet. Certain drugs are now under development to reduce or reverse this loss, by triggering regeneration of nerve cells that have previously atrophied.

To assess the ability of such drugs to produce identifiable anatomical changes which are consistent with nerve regeneration and clinical evaluations of patient nerve function currently requires a trained neuroanatomist "reader" to look for an increase in the percentage or area density of regenerative axon clusters, or an increase in the density of the axon fibers themselves, particularly smaller ones (less than 5 or 6 microns in diameter). To make an assessment the reader has to review the entire area of a complete nerve fiber bundle or fascicle, such as the highly magnified one shown in FIG. 1.

Due to the high magnification required to evaluate the regenerative clusters, typically 1000 or more electron micrographs have to be acquired, digitally registered, mosaicked, processed, and finally reviewed and marked by an anatomist, for each of a large number of samples. Ideally, the anatomist must identify all of the axon fibers (donut-like objects) in the fascicle, of which there may be more than 1000, and also identify all regenerative clusters, which are groups of 2 or more small axons that are completely surrounded by a single basement membrane. These clusters, in particular, are considered to provide direct anatomical evidence of nerve regeneration, and thus are key to proving the benefit of the drug for diabetic patients. Unfortunately, their appearance tends to be quite rare.

The difficulty of establishing the presence of regenerative clusters stems from the fact that the basement membranes, which must be complete and intact to verify that a group of small axons is indeed a regenerative cluster, are only about 50 nanometers wide. In order to guarantee that the membranes will be visible in an image, at least 2–4 pixels are required across their width, representing a resolution of about 60 pixels per micron. Since the fascicles are generally more than 0.5 mm in diameter, this means that for a typical sample, more than 30,000 pixels across the diameter are required at this resolution.

Since it is not currently possible to acquire all of this data in a single electron micrograph exposure, overlapping frames must now be acquired and registered to form a complete mosaic or composite image. In the past this has been done by taking hundreds of film-based images, enlarging them as photographs, and then literally pasting them together manually to produce a composite for review using a magnifier measuring a few meters across.

FIGS. 2A and 2B show two higher resolution views of portions of FIG. 1, which contain more detail. FIG. 2A approximates the low resolution (or "lo-res") level of detail used by the anatomist readers (and queuing algorithms) to mark axons and identify possible clusters. FIG. 2B reveals the level of detail present in full-resolution ("hi-res") imagery at about 60 pixels per micron (though the image shown would normally fill a large computer screen). Full resolution review is required to verify the presence of an actual cluster, or to answer other questions that cannot be resolved at low resolution. In FIG. 2B, for example, following the outside border of the small, doubled-over fiber near the center, the edges of lighter grey structures can be seen within the exterior concavities of the dark myelin sheath that surrounds the brighter axon. It is these thin edges which correspond to the width of a basement membrane, surrounding here by just a single nerve fiber.

Since each fascicle contains usually hundreds, and often more than 1000 axons, requiring a highly trained anatomist to manually mark every axon represents a poor use of their valuable time, as well as being quite tedious and frustrating. To avoid fatigue and the potential negative impact of this manual approach, and to concentrate on the more important task of verifying clusters, this process would benefit from any technique which could automatically cue the axons ahead of time, thereby requiring that the readers simply verify if these cues were correct, and add any that might be missing. Ideally, such a method would also be able to find and cue groups of small axons, which might represent potential clusters. This would direct the attention of readers to specific, high-likelihood events on the fascicle, and increase inter-reader consistency in identifying clusters.

SUMMARY OF THE INVENTION

The present invention provides a method for queuing axon fibers and groups of such fibers, visualized, for example, in micrograph images derived from highly magnified, mosaic-type composites. The method is simple and elegant in concept, involving a relatively small number of major steps, making it possible to generate axon cues in about an hour for data sets on the order of 25 megabytes or more using currently available technology. The method is also reliable, despite the wide degree of variability and different artifacts typically present in such sample images. In addition, the fiber, myelin, and axon objects extracted correspond well to the boundaries that a human would choose, which may be important to area measurement studies. The method also reduces the overall time required by human readers to complete a sample review, thereby making a significant contribution to the timely completion of related research, such as drug evaluation studies.

Broadly, the invention uses grey-level morphological reconstruction operators (conditional dilation and erosion) to obtain more precise estimates of the foreground and background components of interest. That is, given a multiplicity of myelin-sheathed axon fibers in a cross-sectional image containing many such fibers, the method uses these grey-level operators to effectively identify co-occurrences of the axon fibers and their myelin sheaths and output a result representative of the co-occurrences. As a further aspect of the invention, the co-occurrences are sorted in terms of their geometry to identify groups of fibers indicative of axon clusters.

In more specific detail, a grey-level opening and conditional dilation (alternatively, a grey-level connected opening) is first performed on the grey-level input image to obtain, after differencing, a first grey-level residue representative of potential axons. A grey-level closing and conditional erosion of the image (alternatively, a grey-level connected closing) is then performed to obtain after differencing a second residue representative of potential axon fibers, including their respective myelin sheaths. The first residue may then be used as a marker to conditionally dilate over the second residue to identify the co-occurrences. In the preferred embodiment, an independent adaptive threshold is performed relative to each grey-level residue prior to the step of conditionally dilating the first over the second residue. The centroids of the identified fibers may also be located to provide useful cues.

To identify potential clusters, the method may include the following steps:

opening to remove large fiber components;

dilating the fiber components with a geometrical factor to join small fibers into groups of fibers representative of potential clusters;

removing singleton fiber components;

sorting the non-singleton fiber components in accordance with an elliptical shape factor; and labeling the centroids of the remaining components as cluster cues.

BRIEF DESCRIPTION OF THE DRAWINGS

FIGS. 7a through 7c illustrate, in flow-chart form, steps according to the invention including references to other figures contained herein.

DETAILED DESCRIPTION OF THE PREFERRED EMBODIMENT

The present invention resides in a method of cueing axons and axon groups. In particular, the invention performs morphological steps to cue the axons and potential clusters in a particular sample. At present, electron micrograph mosaics were found to be most useful for this purpose, though future, more direct visualization techniques, including light microscopy, may alternatively be used.

The method steps disclosed herein were developed on a downsampled (lo-res) version of the full resolution, mosaic-type composite image for each sample. The downsampling factor was 8:1 in each direction, and was accomplished by block averaging, i.e., by replacing each non-overlapping 8 by 8 group of 64 pixels with a single average value. This results in a resolution of 7 to 8 pixels per micron. The resulting lo-res images ranged in size from 10 to 40 megabytes, or effectively 3.5–7 feet (1–2 meters) in diameter, at 72 dpi.

A digital camera was employed to acquire the imagery, which, in the examples which follow, collects 1K by 1.5K by 1 byte, or 1.5 megabytes, per frame. For a typical sample, due to the overlapping of frames and the need to include the entire border of the fascicle, 1000 frames or more may be required, resulting in more than 1 gigabyte of data. (The range was normally between 1 and 2 gigabytes, though some samples have up to 2.5 gigabytes of raw data). To get an idea of how massive this is, consider that at a nominal screen resolution of 72 dpi (one pixel per typographical "point"), the composite fascicle image would be between 30 and 60 feet (10–20 meters) in diameter.

Figure 1:
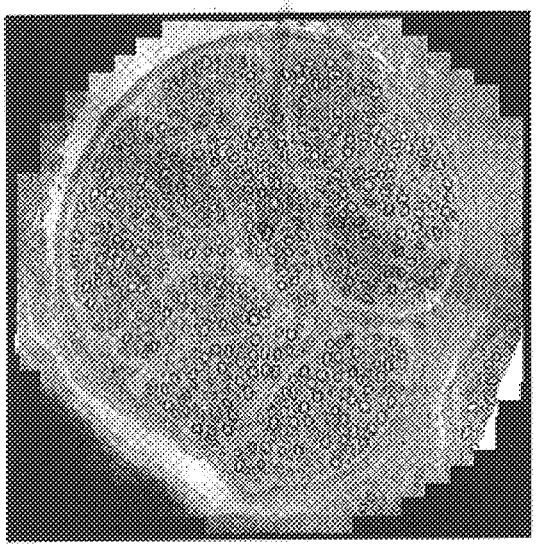
FIG. 1 is an electron micrograph mosaic of a nerve fascicle, depicted in cross-section.
Figure 2A:
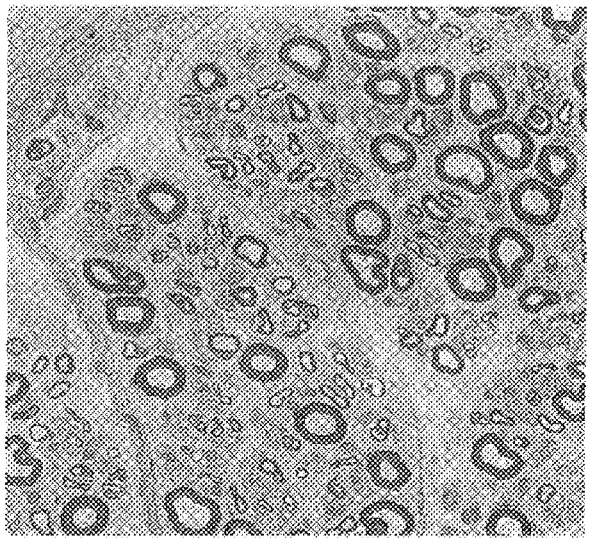
FIG. 2A is a high resolution view of the cross-section of FIG. 1.
Figure 2B:
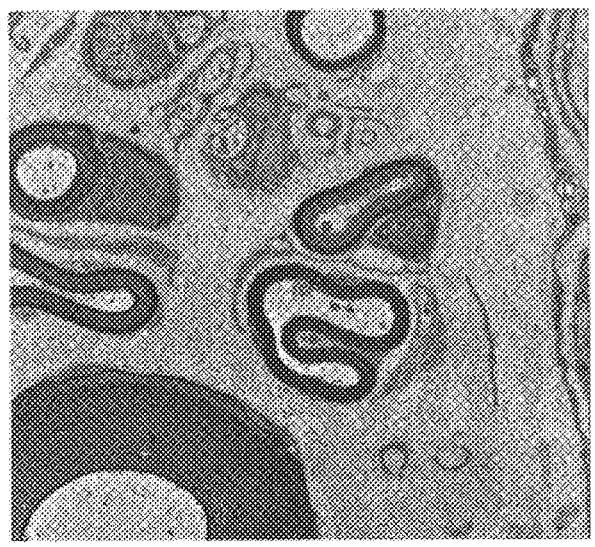
FIG. 2B is yet a higher resolution view of a subregion of the cross-section of FIG. 1, which also illustrates a group of two small axons and a Schwann cell.

As discussed above, an axon fiber is one of the irregular donut-like objects as seen in FIGS. 1 and 2. The axon itself is the light interior portion, while the myelin coating or sheath is the dark grey or black band which surrounds the lighter area. One concern is false alarms due to Schwann cells, which are common in nerve tissue and have led to confusion in earlier, light microscopy studies of nerve fibers. A Schwann cell may be seen in the top-left region of FIG. 2B. These cells are also the same size as small axons, and also have dark exteriors, but their exteriors are more broken than the smooth, uniform myelin covering which surrounds an axon. Schwann cell interiors also have a grey-level texture that makes them less bright and less uniform than the axon interior of a single nerve fiber.

Other problems that make the cueing of axon fibers more difficult include a wide variety of artifacts and variations that can appear in the imaged sample, due to the many preparation steps. The fixation, embedding and handling of the samples in transit, can all affect quality, how the fibers appear, and how they behave during later preparation steps, or within the microscope. The sectioning steps may also introduce various types of artifacts, such as the dark lines seen in FIG. 1. Such artifacts may also include overall gradient variations due to non-uniform thickness, a "washboard" or finer "corrugation" grey-level appearance due to compression by the diamond knife, and dark cut lines or other scratches if the knife has become dull or has nicks. Staining non-uniformities (within or between samples) may also occur, as well as stain blotches on the sample, or dark carbon particles from a carbon-coating step. Dark fracture lines may appear if the sample is dried out. Variations or errors in the microscope set-up procedures may cause changes in overall contrast. If the beam is left too long in one place during focusing, a locally lighter, etched disk area may appear. Slight warping may also occur due to heating from the electron beam. This warping, and other factors, may lead to registration errors, causing the axons to appear broken.

From an algorithmic point of view, a global threshold, whether fixed or adaptive, will not work in selecting either the bright axon interiors, or the dark myelin surrounds of the nerve fibers. A classic morphological "top-hat" operation, with a fixed maximal size and a fixed threshold, will also not produce a usable result. Clearly a local approach must be used, given the types of variations present. This local approach must also be adaptive to the characteristics of the individual sample however, because there is simply too much variation between samples to allow the use of a fixed criterion over the entire population. An opening residue by a large element, followed by an adaptive threshold, seemed to offer promise, but did not produce a sufficient clean result. Other spatially variant, locally adaptive approaches were found to be computationally intensive, given the massive size of even the 8:1 reduced lo-res images (10–40 megabytes), and the wide variation in axon sizes (1–20 microns in diameter).

The solution to this problem came from examining the characteristics of profiles of the fibers, and understanding the implications of these in three dimensions. In the grey-level profile, the fiber looks like a "castle" (some might say an "ivory tower") surrounded by a deep "moat." The castle or tower is the bright axon interior, while the moat is the surrounding myelin sheath. The castle may be of varying size and irregular shape (preventing the use of an "annulus" or "ring" structuring element in extracting it), but under normal circumstances, the moat completely surrounds it, regardless of what that shape is.

To extract the complete fiber for later area and distance measurements, it was not sufficient to extract the axons only, and just use these as cues. Also, this would not have been entirely accurate; it is really the co-occurrence of the bright axon tower and the dark myelin moat that defines the existence of a fiber. Accordingly, both components should be used together for an accurate result. The myelin regions are also difficult to extract cleanly by themselves, with the towers or axons still in place. Furthermore, since it was not possible to perform detailed sizing operations on such large data sets, it was necessary to have a way to use single (maximal) sizes for the necessary opening and closing operations, yet, at the same time, obtain a clean extraction of all of the fibers, no matter what their size, despite differences in the surrounding tissues, and the kinds of grey-level variations described earlier.

Thus the decision was made to use grey-level reconstruction algorithms (grey conditional dilation and erosion), in conjunction with maximal size openings and closings, to allow recovery of regions in the grey-level foreground or background that would be eliminated by the initial operations, but which were connected to other larger areas that had not been eliminated. This was done prior taking a difference, in computing the grey-level residue of the opening or closing, and it resulted in much cleaner results, even for the very small nerve fibers. Alternatively, one could use morphological "connected openings and closing"—reconstruction operators which are size-independent—in place of the operators used here, prior to taking the differences or residues.

Figure 3A:
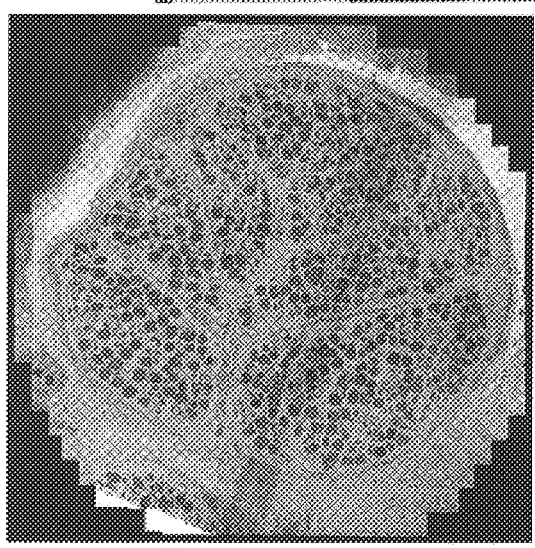
FIG. 3A is a grey-level opening of the cross-sectional image obtained after conditional dilation over the original FIG. 1.
Figure 3B:
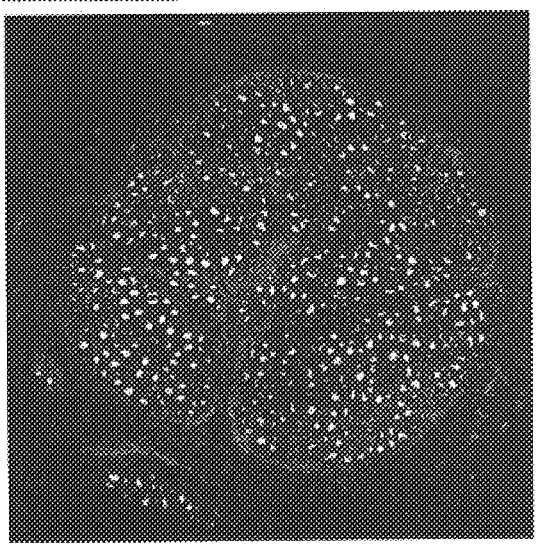
FIG. 3B shows the residue of the grey opening and conditional dilation of FIG. 3A with respect to FIG. 1.

FIG. 3 illustrates the grey-level opening (radius 32 hexagon), followed by a grey conditional dilation, and FIG. 3B shows the corresponding residue for the image in FIG. 1. One could alternatively use a connected opening, in place of the opening with conditional dilation.

Figure 4A:
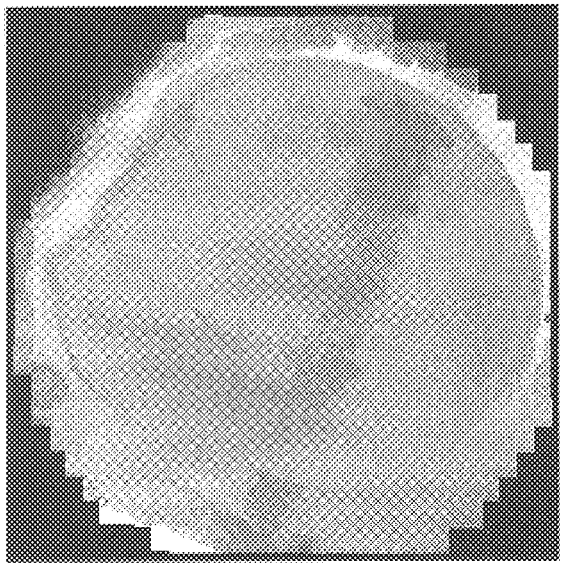
FIG. 4A illustrates a grey closing of the image of FIG. 3A with conditional erosion.
Figure 4B:
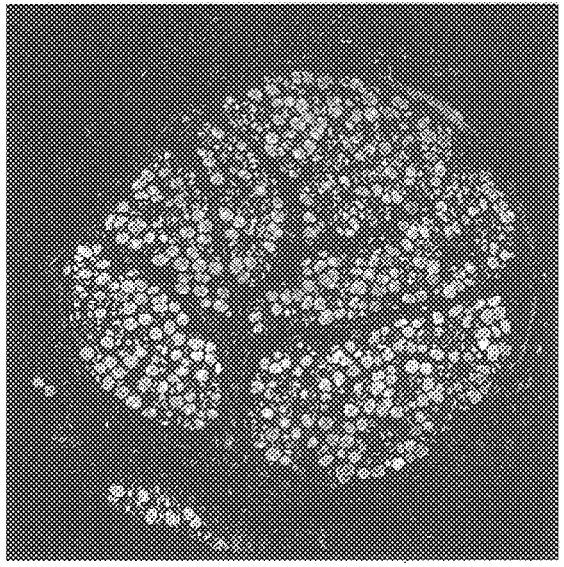
FIG. 4B illustrates the residue obtained from the subtraction of the image of FIG. 3A from the image of FIG. 4A.

To better extract the area of the myelin and the complete axon fibers, it was decided to begin with the modified opening result, as shown in FIG. 3. The bright axon "towers" have now been removed, and what remains are deep "pits" representing the entire fibers, with grey levels corresponding to those of the dark myelin sheaths. By closing these pits with an even larger disk structuring element (radius 64 hexagon), and performing a dual grey-level reconstruction (conditional erosion) of the result, a very clean extraction of the fiber extents was obtained after subtraction, again, across all different sizes present in the lo-res images. Again, a connected closing could also be used here instead of the closing with conditional erosion. FIGS. 4A and 4B illustrate these steps, again, for the sample of FIG. 1.

Once the two residue results have been obtained, each is preferably thresholded adaptively based on a 2-class factor analysis approach (minimal sum of variances), to allow slightly different thresholds to be used in accordance with the particular characteristics of each sample. This gives two binary results, representing potential axons and potential fibers. Then, by using the axons as markers to conditionally dilate over the fibers, a result is obtained which represents the co-occurrence of a dark surround and a bright interior.

Figure 5:
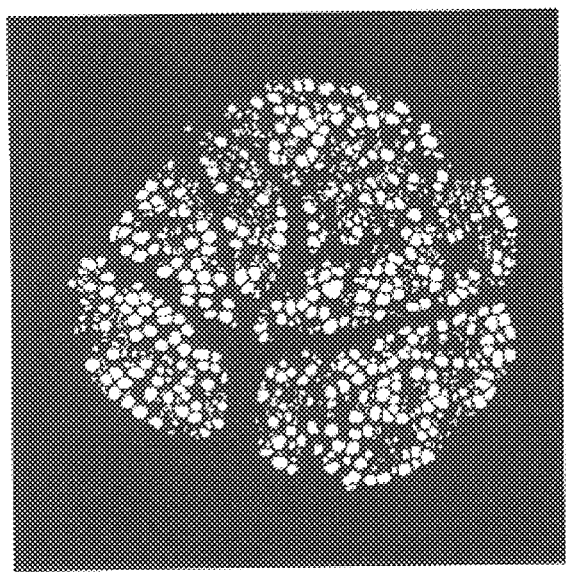
FIG. 5 is a binary image of extracted axon fibers according to the invention.

Subsequent steps may be used to filter out very small noise objects, and/or remove non-convex attachments (e.g., linear artifacts) from larger fibers. Additional steps attempt to remove axons belonging to adjacent fascicles. The resulting fibers, as shown in FIG. 5, are labeled, and their axon centroids are extracted to serve as the axon cues. This image vividly illustrates the very dense packing of the nerve fibers that occurs within the fascicle, very much like wires in a data communications cable. Once the axon cues were obtained, groups of small fibers were located which might represent clusters, and which therefore should be viewed using hi-res imagery by the anatomist readers.

The cluster cueing aspect of the invention starts with the fiber and axon binary outputs of the previous axon cueing result. Three criteria were used to select the groups: size, distance, and group shape factor. First, the myelin components were computed by subtracting the axons from the fibers. Any fibers whose myelin components contained radius 5 hexagons were removed as being too large or thick to be of interest as cluster elements. The remaining fibers were labeled and their binary extents were dilated by a hexagon of size 3, to join nearby small fibers into groups, representing possible clusters. The maximum and minimum label under each dilated component was determined, and those having a different maximum and minimum (i.e., containing more than 1 fiber label) were retained, thus removing the singletons.

Figure 6:
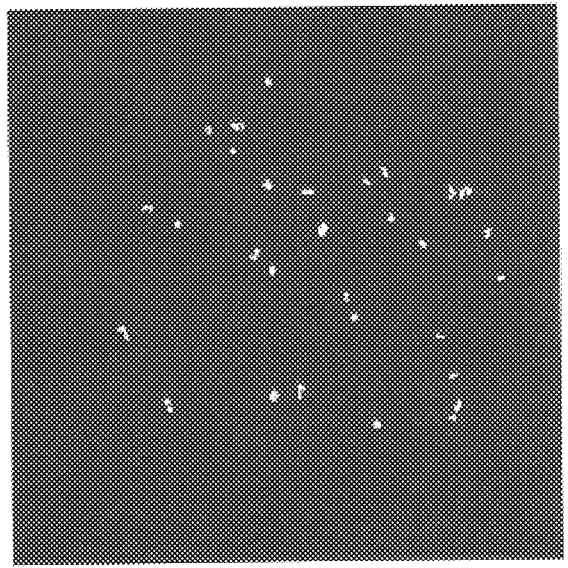
FIG. 6 is a binary image of potential axon clusters according to the invention.

Shape factors on the remaining dilated components were computed to eliminate those with shape factors of more than 3.0. (A round disk has a shape factor of 1.0; for lines it is infinite). This was done because true clusters, which are surrounded by a single basement membrane, typically appear to fall within the same round or elliptical extent. The centroids of the remaining components were finally extracted as the potential cluster cues. FIG. 6 shows a binary image of the potential clusters identified by this cueing algorithm, again for FIG. 1.

Figure 7B:
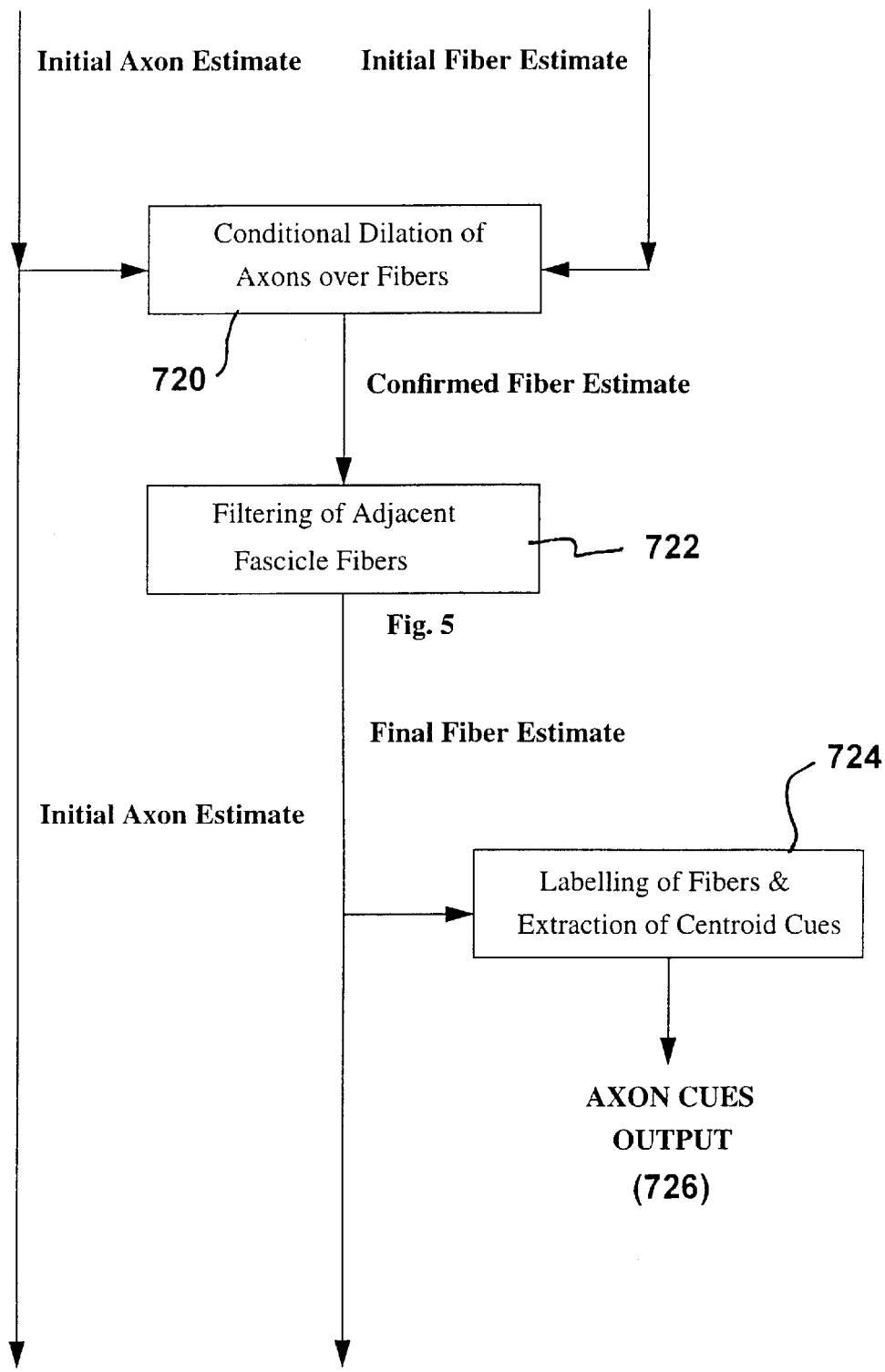

FIGS. 7a through 7c illustrate, in flow-chart form, important steps according to the invention along with references to other figures disclosed herein. As shown in FIG. 7a, a full resolution electron micrograph image is preferably down-sampled and averaged at functional block 702 with the results being used at blocks 704 and 706, respectively, wherein a grey-level opening and conditional dialation (FIG. 3A) and opening residue (FIG. 3B) are performed. The result of the grey-level opening and conditional dialation is also used at blocks 708 and 710, wherein a grey-level closing and conditional erosion (FIG. 4A) and closing residue (FIG. 4B) are performed, respectively. Adaptive threshold and binary artifact filtering operations are preferably performed on both the output of the opening residue in block 706 and the results of the closing residue 710, resulting in an initial axon estimate and initial fiber estimate, respectively.

As shown in FIG. 7b, these estimates are each fed to a block 720 wherein a conditional dialation of axons over fibrous is performed, resulting in a confirmed fiber estimate which is fed to block 722 wherein a filtering of adjacent fascicle fibers is performed (FIG. 5). A final fiber estimate is delivered to block 724 wherein a labeling of fibers and extraction of centroid queues takes place, resulting in an axon queues output (726). The results of the initial axon estimate and final fiber estimate are also made available to a myelin contribution by subtracting axons from fibers as indicated with block 730 in FIG. 7c. Other preferred steps include the removal of large axons via myelin at 732, and the grouping of small axon fibers at block 734. Singleton groups are removed at block 736 and a calculation of group shape factors is performed at block 738. Non-round groups are preferably removed from block 740 (FIG. 6), resulting in a final cluster estimate (742), which is fed to block 744 wherein the labeling of cluster groups and extraction of centroid queues is carried out, resulting in a final cluster queues output (750).

EXAMPLE

So as to validate the invention, two human readers were asked to review the same 3 samples twice; first entirely manually, and again with axon and potential cluster cues marked using the methods disclosed herein. It was important to confirm that the presence of the axon and cluster cues would not introduce any biases in the readers' responses (such as blindly accepting the cued results), when compared to the completely manual marking condition. As a side effect of these tests, each reader's results could also be compared in both conditions, that is, directly against the outputs of the cueing algorithms, to see to what extent the readers agreed with the marks provided by the programs.

The false alarm rate for the axon cueing algorithm was around 1–2 percent, particularly for the interior portion of the central fascicle. Depending on the success of the adjacent fascicle removal algorithm, there might also be additional false alarms on axons outside the main fascicle, or on odd patterns in the bounding periphery. One highlight here was that the axon cueing algorithm almost never false alarmed on Schwann cells, which was considered to be quite an outstanding result. In later production processing, the only exceptions were in cases of very advanced disease progression and nerve degeneration, where axons overall were quite sparse, so that the adaptive thresholding algorithm could not decide on an accurate cut point.

With regard to misses, the axon cueing algorithm found approximately 95 percent of the axons marked by the readers, missing between four and six percent. Of these misses, about half were due to registration faults where the myelin had been sheared or otherwise broken. Since the invention was not optimized for this condition, the method was actually marking more than 97 percent of the axons it was intended to identify, and which it should have marked if the registration errors had been eliminated. The rest of the misses included cases where the myelin was especially light in one area due to local contrast variation or staining non-uniformities, or where it had been cut due to one of the other types of artifacts.

As to the cluster cueing, while the readers almost never rejected a potential cluster cue as being not worth checking at high resolution, the method managed to find slightly more than half of the potential cluster cues that the readers themselves marked at low resolution. Since the clusters usually occur in groups, in terms of directing the attention of the readers to areas where clusters were likely to be located, the invention probably covered more like 70 or 80 percent of the relevant areas. In the majority of the missed cases, the miss was caused because one of the component axons of the cluster had been missed (often due to registration errors or one of the other problems described above). This meant that the distance between the remaining axons was too large for the algorithm to group them together as a cluster. Other groups were incorrectly eliminated due to the shape factor or the maximum myelin thickness criterion.

In terms of marking time, these tests showed that the presence of the axon and cluster cues reduced the marking phase of the review process by about 50 percent, which resulted in the average time for a single read being reduced from three hours to two hours. There were also no significant accuracy differences found between the cued and uncued results, though the readers showed slightly more agreement with each other (about five percent) on both axons and potential clusters, when the cues were present.

What is claimed is:

1. A method of identifying myelin-sheathed axon fibers in a cross-sectional image containing many such fibers, comprising the steps of:

performing grey-level morphological reconstruction operations on the image to identify co-occurrences of the axon fibers and their myelin sheaths; and outputting a result representative of the co-occurrences.

2. The method of claim 1, further including the step of:

geometrically sorting the co-occurrences to identify groups of fibers indicative of axon clusters.

3. The method of claim 1, further including the steps of:

performing a grey-level opening and conditional dilation of the image to obtain a first residue representative of potential axons;

performing a grey-level closing and conditional erosion of the first opening image to obtain a second residue representative of potential axon fibers including their respective myelin sheaths; and conditionally dilating over the second residue using the first residue as a marker to identify the co-occurrences.

4. The method of claim 3, further including the steps of:

independently adaptively thresholding each residue prior to the step of conditionally dilating over the second residue.

5. A method of identifying axon/sheath co-occurrences in a cross-sectional image, comprising the steps of:

performing a grey-level opening and conditional dilation of the image to obtain a first thresholded residue indicative of axon components;

performing a grey-level closing and conditional erosion of the first opening image to obtain a second thresholded residue indicative of fiber components including their respective myelin sheaths; and conditionally dilating over the second thresholded residue using the first thresholded residue as a marker to identify the axon/sheath co-occurrences.

6. The method of claim 5, further including the step of:

finding the centroids of the axon fibers to serve as axon cues.

7. The method of claim 5, further including the step of:

adaptively thresholding each residue independently prior to the step of conditionally dilating over the second residue.

8. The method of claim 5, further including the step of:

geometrically sorting the co-occurrences to identify groups of fibers indicative of axon clusters.

9. The method of claim 8, further including the step of:

subtracting the axon components from the fiber components to yield contributions attributable to the myelin sheaths.

10. The method of claim 9, further including the step of:
removing myelin sheath contributions in accordance with a size constraint.

11. The method of claim 10, further including the step of:
dilating the remaining fiber components with a shape factor to join small fibers into groups of fibers representative of potential clusters.

12. The method of claim 11, further including the step of:
removing singleton fiber components.

13. The method of claim 12, further including the step of:
sorting the non-singleton fiber components in accordance with an elliptical shape factor.

14. The method of claim 13, further including the step of:
labeling the centroids of the remaining components as cluster cues.

15. A method of identifying clusters of myelin-sheathed axon fibers in a cross-sectional image containing such clusters, comprising the steps of:
performing grey-level morphological reconstruction operations on the image to identify co-occurrences of the axon fibers and their myelin sheaths; and
geometrically sorting the co-occurrences to identify groups of fibers indicative of axon clusters.

* * * * *